United States Patent
Agombar et al.

(10) Patent No.: US 10,175,888 B2
(45) Date of Patent: Jan. 8, 2019

(54) PERFORMANCE-BALANCED HETEROGENEOUS RAID

(71) Applicant: International Business Machines Corporation, Armonk, NY (US)

(72) Inventors: John P. Agombar, Winchester (GB); Ian Boden, Eastleigh (GB); Alastair Cooper, Winchester (GB); Gordon D. Hutchison, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 15/291,440

(22) Filed: Oct. 12, 2016

(65) Prior Publication Data
US 2018/0101301 A1 Apr. 12, 2018

(51) Int. Cl.
*G06F 3/06* (2006.01)

(52) U.S. Cl.
CPC ............ *G06F 3/061* (2013.01); *G06F 3/0631* (2013.01); *G06F 3/0632* (2013.01); *G06F 3/0689* (2013.01)

(58) Field of Classification Search
CPC ...... G06F 3/0604; G06F 3/061; G06F 3/0629; G06F 3/0644; G06F 3/067; G06F 3/0683
See application file for complete search history.

(56) References Cited

U.S. PATENT DOCUMENTS

| | | | |
|---|---|---|---|
| 6,484,235 B1 * | 11/2002 | Horst | G06F 3/061 711/114 |
| 7,856,528 B1 | 12/2010 | Frost et al. | |
| 8,862,845 B2 | 10/2014 | Lary et al. | |
| 8,930,653 B1 * | 1/2015 | Chatterjee | G06F 11/1453 711/154 |
| 9,323,616 B2 | 4/2016 | Taranta, II et al. | |
| 2012/0271997 A1 | 10/2012 | Galloway et al. | |
| 2014/0173186 A1 | 6/2014 | Randall et al. | |
| 2015/0309898 A1 * | 10/2015 | Shi | G06F 11/1076 714/6.23 |

FOREIGN PATENT DOCUMENTS

| | | |
|---|---|---|
| WO | WO2015057094 A1 | 4/2015 |
| WO | WO2016023005 A1 | 2/2016 |

* cited by examiner

*Primary Examiner* — Eric Carwell
(74) *Attorney, Agent, or Firm* — Nelson and Nelson; Daniel P. Nelson; Alexis V. Nelson

(57) ABSTRACT

A method for balancing performance in a redundant array of independent disks (RAID) made up of heterogeneous storage drives is disclosed. In one embodiment, such a method includes implementing a RAID on a set of storage drives. The set of storage drives includes a lower-performing storage drive that underperforms other storage drives in the set. In order to balance performance in the RAID, the method stripes data across the set of storage drives such that the lower-performing storage drive participates in only a selected percentage of strides. In certain embodiments, this percentage is selected based on an amount the lower-performing storage drive underperforms other storage drives in the set. A corresponding system and computer program product are also disclosed.

20 Claims, 9 Drawing Sheets

|  | Drive 1 | Drive 2 | Drive 3 | Drive 4 | Drive 5 | Drive 6 | Drive 7 | Drive 8 | Drive 9 | Drive 10 | Drive 11 | Drive 12 |
|---|---|---|---|---|---|---|---|---|---|---|---|---|
| Stride 1 | 1 | 1 | 1 | 1 | 1 | 1 | 1 | 1 | 1 | 1 | 1 | 1 |
| Stride 2 | 0 | 1 | 1 | 1 | 1 | 1 | 1 | 1 | 1 | 1 | 1 | 1 |
| Stride 3 | 1 | 1 | 1 | 1 | 1 | 1 | 1 | 1 | 1 | 1 | 1 | 1 |
| Stride 4 | 0 | 1 | 1 | 1 | 1 | 1 | 1 | 1 | 1 | 1 | 1 | 0 |
| Stride 5 | 1 | 1 | 1 | 1 | 1 | 1 | 1 | 1 | 1 | 1 | 1 | 1 |
| Stride 6 | 0 | 1 | 1 | 1 | 1 | 1 | 1 | 1 | 1 | 1 | 1 | 1 |
| Stride 7 | 1 | 1 | 1 | 1 | 1 | 1 | 1 | 1 | 1 | 1 | 1 | 1 |
| Stride 8 | 0 | 1 | 1 | 1 | 1 | 1 | 1 | 1 | 1 | 1 | 1 | 0 |
| Stride 9 | 1 | 1 | 1 | 1 | 1 | 1 | 1 | 1 | 1 | 1 | 1 | 1 |
| Stride 10 | 0 | 1 | 1 | 1 | 1 | 1 | 1 | 1 | 1 | 1 | 1 | 1 |
| Stride 11 | 1 | 1 | 1 | 1 | 1 | 1 | 1 | 1 | 1 | 1 | 1 | 1 |
| Stride 12 | 0 | 1 | 1 | 1 | 1 | 1 | 1 | 1 | 1 | 1 | 1 | 0 |
| Stride 13 | 1 | 1 | 1 | 1 | 1 | 1 | 1 | 1 | 1 | 1 | 1 | 1 |
| Stride 14 | 0 | 1 | 1 | 1 | 1 | 1 | 1 | 1 | 1 | 1 | 1 | 1 |
| Stride 15 | 1 | 1 | 1 | 1 | 1 | 1 | 1 | 1 | 1 | 1 | 1 | 1 |

PERFORMANCE-BALANCED HETEROGENEOUS RAID

BACKGROUND

Field of the Invention

This invention relates to systems and methods for balancing performance in redundant arrays of independent disks (RAIDs) made up of heterogeneous storage drives.

Background of the Invention

A RAID (i.e., a Redundant Array of Independent Disks) is a storage technology that provides increased storage functions and reliability through redundancy. A RAID is created by combining multiple storage drive components (disk drives and/or solid state drives) into a logical unit. Data is then distributed across the drives using various techniques, referred to as "RAID levels." The standard RAID levels, which currently include RAID levels 1 through 6, are a basic set of RAID configurations that employ striping, mirroring, and/or parity to provide data redundancy. Each of the configurations provides a balance between two key goals: (1) increasing data reliability and (2) increasing I/O performance.

In some cases, although not always ideally, a RAID may be implemented using a heterogeneous set of storage drives. That is, a RAID may in certain cases be implemented using storage drives having different storage capacities and/or I/O performance. In some cases, the set of storage drives making up a RAID may start out homogenous but become more heterogeneous over time as some storage drives are replaced with other storage drives that are faster, less expensive, or larger in terms of storage capacity. Although a homogeneous RAID (i.e., a RAID made up of identical storage drives) may be preferred in terms of providing desired and predictable I/O performance, it may not always be practical or cost-effective, particularly with very large arrays of storage drives, such as large distributed arrays. However, implementing a RAID using a heterogeneous set of storage drives may cause the RAID to run at the performance of the lowest-performing storage drive in the RAID. This effectively renders useless or ineffective any extra performance and/or storage capacity of other storage drives in the RAID.

In view of the foregoing, what are needed are systems and methods to more effectively integrate storage drives of differing performance and/or storage capacity into a RAID. Ideally, such systems and methods will be able to balance performance of heterogeneous storage drives to maximize the performance of the RAID as a whole.

SUMMARY

The invention has been developed in response to the present state of the art and, in particular, in response to the problems and needs in the art that have not yet been fully solved by currently available systems and methods. Accordingly, systems and methods in accordance with the invention have been developed to balance performance in redundant arrays of independent disks (RAIDs) made up of heterogeneous storage drives. The features and advantages of the invention will become more fully apparent from the following description and appended claims, or may be learned by practice of the invention as set forth hereinafter.

Consistent with the foregoing, a method for balancing performance in a redundant array of independent disks (RAID) made up of heterogeneous storage drives is disclosed. In one embodiment, such a method includes implementing a RAID on a set of storage drives. The set of storage drives includes a lower-performing storage drive that under-performs other storage drives in the set. In order to balance performance in the RAID, the method stripes data across the set of storage drives such that the lower-performing storage drive participates in only a selected percentage of strides. In certain embodiments, this percentage is selected based on an amount the lower-performing storage drive underperforms other storage drives in the set.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 6 is a high-level block diagram showing a bitmap for the RAID of FIG. 5;

DETAILED DESCRIPTION

Figure 1:
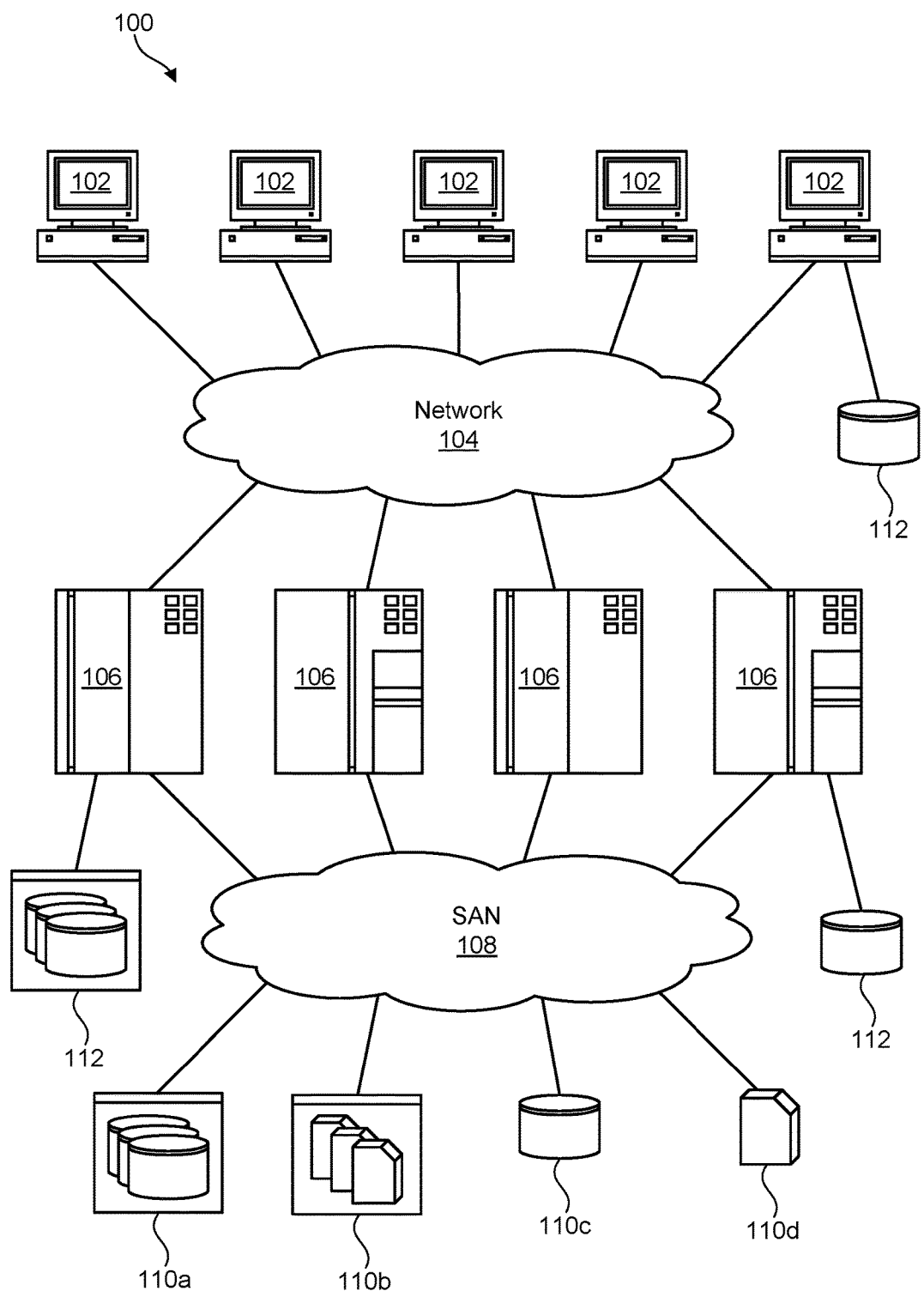
FIG. 1 is a high-level block diagram showing one example of a network environment comprising storage systems such as storage arrays.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment comprising one or more storage arrays. The network environment 100 is presented only by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-storage drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

Figure 2:
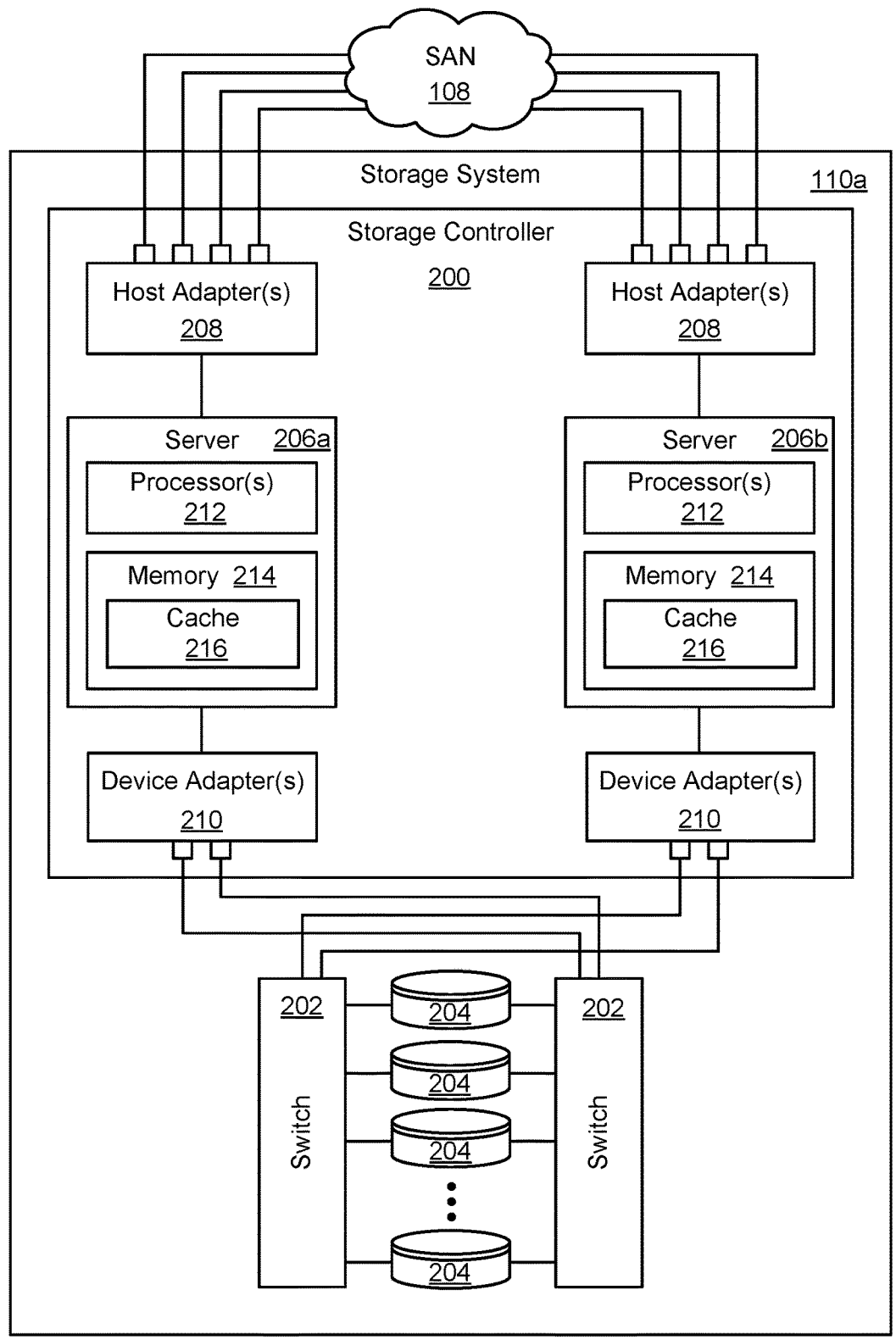
FIG. 2 is a high-level block diagram showing one embodiment of a storage system that contains one or more arrays of storage drives.

Referring to FIG. 2, one example of a storage system 110a containing an array of hard-disk drives 204 and/or solid-state drives 204 is illustrated. The internal components of the storage system 110a are shown since a redundant array of independent disks (RAID) may be implemented on such an array. As shown, the storage system 110a includes a storage controller 200, one or more switches 202, and one or more storage drives 204, such as hard-disk drives 204 and/or solid-state drives 204 (e.g., flash-memory-based drives 204). The storage controller 200 may enable one or more hosts 106 (e.g., open system and/or mainframe servers 106) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110a having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the techniques disclosed herein are not limited to the IBM DS8000™ enterprise storage system 110a, but may be implemented in any comparable or analogous storage system 110, regardless of the manufacturer, product name, or components or component names associated with the system 110. Any storage system that could benefit from one or more embodiments of the invention is deemed to fall within the scope of the invention. Thus, the IBM DS8000™ is presented only by way of example and not limitation.

Figure 3:
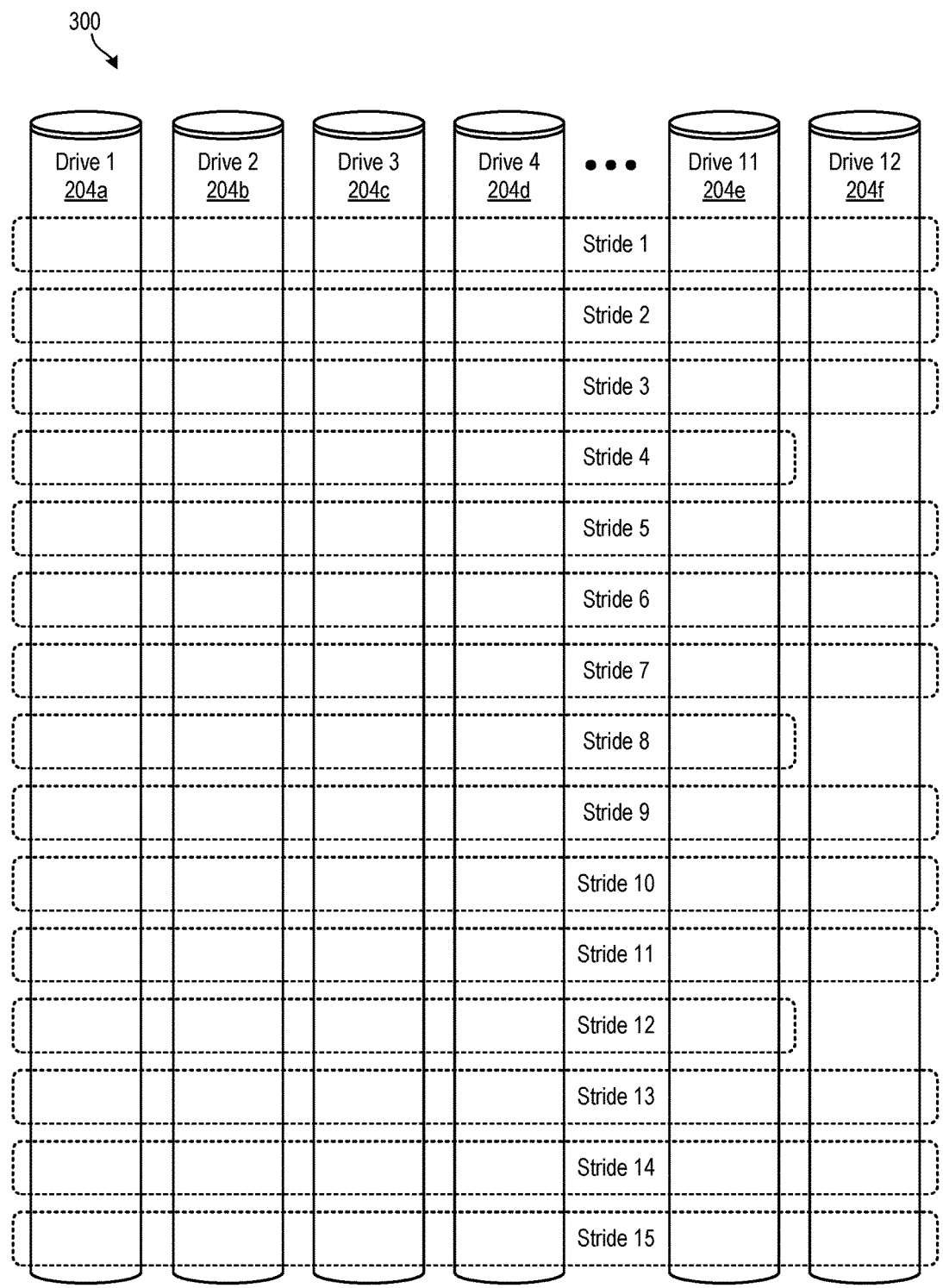
FIG. 3 is a high-level block diagram showing a first example of a RAID made up of heterogeneous storage drives, and a technique for balancing performance in the RAID.

Referring to FIG. 3, as previously mentioned, a RAID 300 may in certain cases be implemented using a heterogeneous set of storage drives 204 having different storage capacities and/or I/O performance. The storage drives 204 in such a RAID 300 may, however, run at the performance of the lowest-performing storage drive in the RAID 300. Thus, systems and methods are needed to more effectively integrate storage drives 204 of differing performance and/or storage capacity into a RAID 300, without substantially reducing the I/O performance of other storage drives 204 in the RAID 300. Ideally, such systems and methods will balance the performance of heterogeneous storage drives 204 to maximize the performance of the RAID 300 as a whole. One example of such a RAID 300 is illustrated in FIG. 3.

FIG. 3 shows one embodiment of a RAID 300 comprising twelve storage drives 204a-f. The set of storage drives 204a-f shown in FIG. 3 may be the entire set of storage drives 204 in the RAID 300 or be a subset of storage drives 204 in a larger RAID 300, such as a distributed RAID 300. The number of storage drives 204 (twelve) is provided by way of example and not limitation. Assume, for the purposes of this example, that the first eleven storage drives 204a-e have similar performance characteristics and storage capacity, while the twelfth storage drive 204f only performs at seventy-five percent of the level of the first eleven storage drives 204a-e. As further shown in FIG. 3, assume that data is striped across the storage drives 204 to form multiple strides, labeled as Strides 1-15. Each stride may include multiple strips (i.e., data segments or elements), where each strip is stored on a different storage drive 204 of the RAID 300. Thus, the strides illustrated in FIG. 3 are shown to span multiple storage drives 204.

In order to balance the I/O performance in the RAID 300, data may be striped across the storage drives 204 such that a lower-performing storage drive 204f (i.e., Drive 12 in this example) participates in only a selected percentage of strides in the RAID 300. In certain embodiments, the percentage is selected based on an amount the lower-performing storage drive 204f underperforms other storage drives 204a-e in the RAID 300. Because the lower-performing storage drive 204f performs at seventy-five percent of the level of other storage drives 204a-e in the RAID 300, the lower-performing storage drive 204f is only used in seventy-five percent of the strides. Thus the lower-performing storage drive 204f does not participate in every fourth stride, in this example Strides 4, 8, and 12. This will reduce the I/O workload on the lower-performing storage drive 204f by approximately twenty-five percent. The other storage drives 204a-e, by contrast, may operate with a full workload. This will allow the other storage drives 204a-e to operate at close to their full capacity and performance without being slowed down significantly by the lower-performing storage drive 204f.

Because the lower-performing storage drive 204f does not participate in Strides 4, 8, and 12, the strips on other storage drives 204a-e in these strides may, in certain embodiments, be larger since the data of these strides is spread across fewer storage drives 204. That is, the storage drives 204a-e that participate in these strides may need to store slightly (approximately eight percent) more data to make up for the storage drive 204f that is not participating. Alternatively, the amount of data in Strides 4, 8, and 12 may be reduced compared to other strides so that the strip size stays substantially the same.

Figure 4:
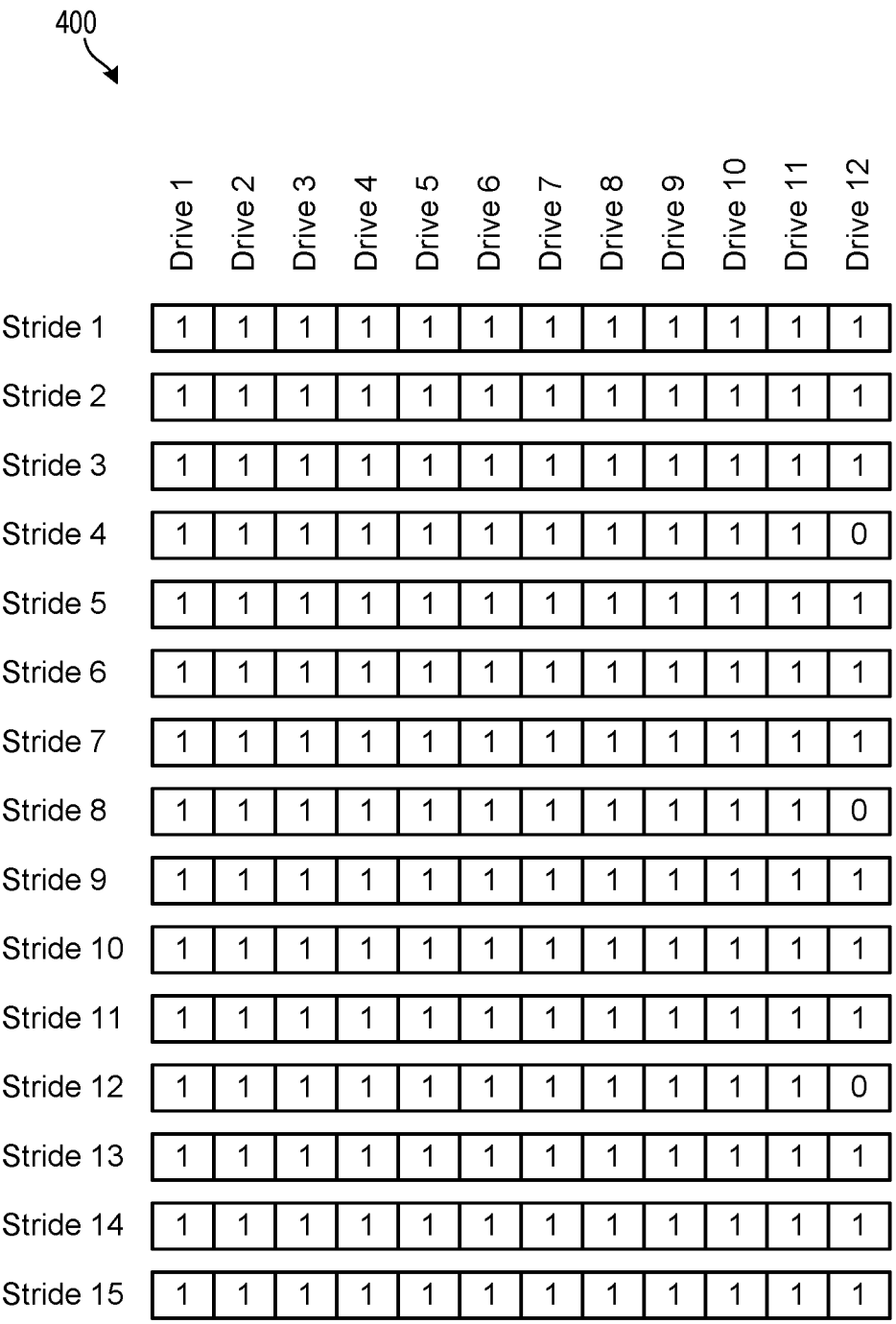
FIG. 4 is a high-level block diagram showing a bitmap for the RAID of FIG. 3.

Referring to FIG. 4, a bitmap 400 may be used to indicate which storage drives 204 are used by a stride. The illustrated bitmap 400 may be the entire bitmap 400 for a RAID 300 or be a subset of a larger bitmap 400 used for a larger RAID 300. As shown, the bitmap 400 includes a row of bits for each stride in the RAID 300. Each column is associated with a storage drive 204 in the RAID 300. A value of "1" indicates that the corresponding storage drive 204 is participating in the stride, while a value of "0" indicates that the corresponding storage drive 204 is not participating in the stride. In certain embodiments, the "0" simply indicates that the "1" is masked or not considered in the bitmap 400. As shown in FIG. 4, strides 4, 8, and 12 include a value of "0" for Drive 12 since this drive does not participate in these strides (i.e., is not part of the "parity set" of these strides). As a result, Drive 12 would not be called upon to reconstruct data in strides 4, 8, and 12 in the event data is lost in one of these strides. By contrast, Drive 12 does participate in all other strides. As a result, Drive 12 would likely be called upon to reconstruct data that is lost in these other strides.

Figure 5:
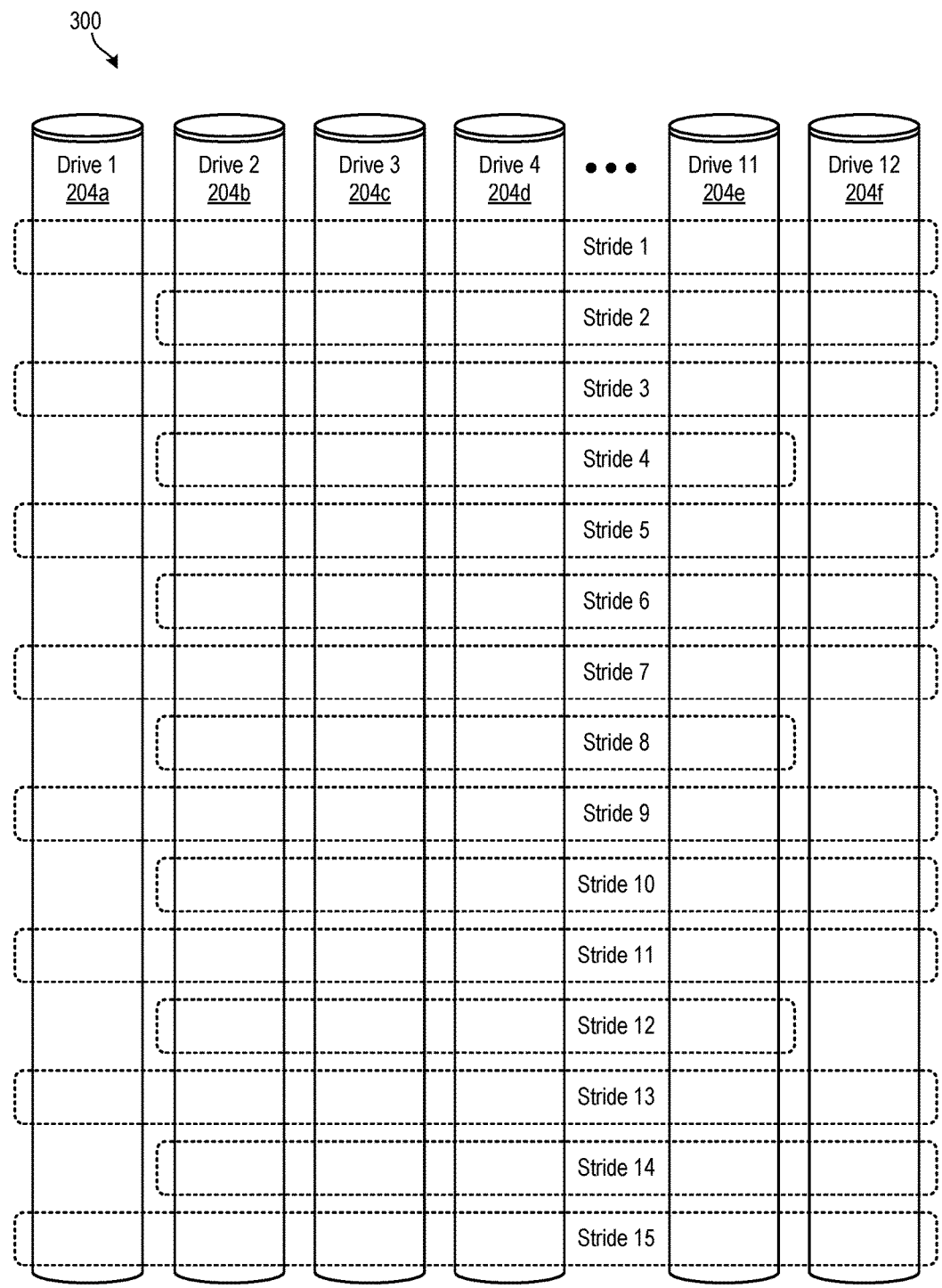
FIG. 5 is a high-level block diagram showing a second example of a RAID made up of heterogeneous storage drives, and a technique for balancing performance in the RAID.

Referring to FIG. 5, assume that the RAID 300 illustrated in FIG. 3 includes a second lower-performing storage drive 204a, in this example Drive 1. Further assume that the second lower-performing storage drive 204a has I/O performance that is roughly fifty percent of the other storage drives 204b-e in the RAID 300 (not counting the lower-performing storage drive 204f). In this example, the second lower-performing storage drive 204a only participates in every other stride, thereby reducing the I/O workload of the second lower-performing storage drive 204a by roughly half. In this example, Strides 1, 3, 5, 7, 9, 11, 13, and 15 utilize all of the storage drives 204; Strides 2, 6, 10, and 14 utilize all of the storage drives 204 except one; and Strides 4, 8, and 12 utilize all of the storage drives 204 except two. This will ensure that each storage drive 204 is able to operate at close to its maximum performance and capability. A bitmap 400 for the RAID 300 illustrated in FIG. 5 is shown in FIG. 6.

Like the previous example, the strip size in each stride may in certain embodiments be adjusted to account for the number of storage drives 204 participating in the stride. Alternatively, the strip size may be kept the same in each stride and the overall size of each stride may be adjusted based on the number of storage drives 204 that are participating. in the stride. Storage drives 204a, 204f that are omitted from selected strides may store less data than storage drives 204 that do participate in all strides, thereby not utilizing some storage space (assuming all storage drives 204 in the RAID 300 have the same storage capacity). However, the I/O performance improvements of the RAID 300 may compensate for any loss of storage space in the RAID 300.

Although FIGS. 3 and 5 describe techniques for integrating one or more lower-performing storage drives 204 into a RAID 300, similar techniques may be used to integrate storage drives 204 of reduced storage capacity into a RAID 300. Specifically, storage drives 204 of reduced storage capacity may only participate in a selected percentage of strides in the RAID 300. For example, if a storage drive 204 has only seventy-five percent of the storage capacity of other storage drives 204 in a RAID 300, the storage drive 204 may only participate in seventy-five percent of the strides. Similarly, if a storage drive 204 has only fifty percent of the storage capacity of other storage drives 204 in a RAID 300, the storage drive 204 may only participate in half of the strides. This technique is beneficial in that each storage drive 204 of the RAID 300 will run out of capacity at substantially the same time despite their different storage capacities, or have their storage capacities proportionally used up or freed. This technique may efficiently utilize storage space in a RAID 300 made up of storage drives 204 of differing storage capacities.

Figure 7:
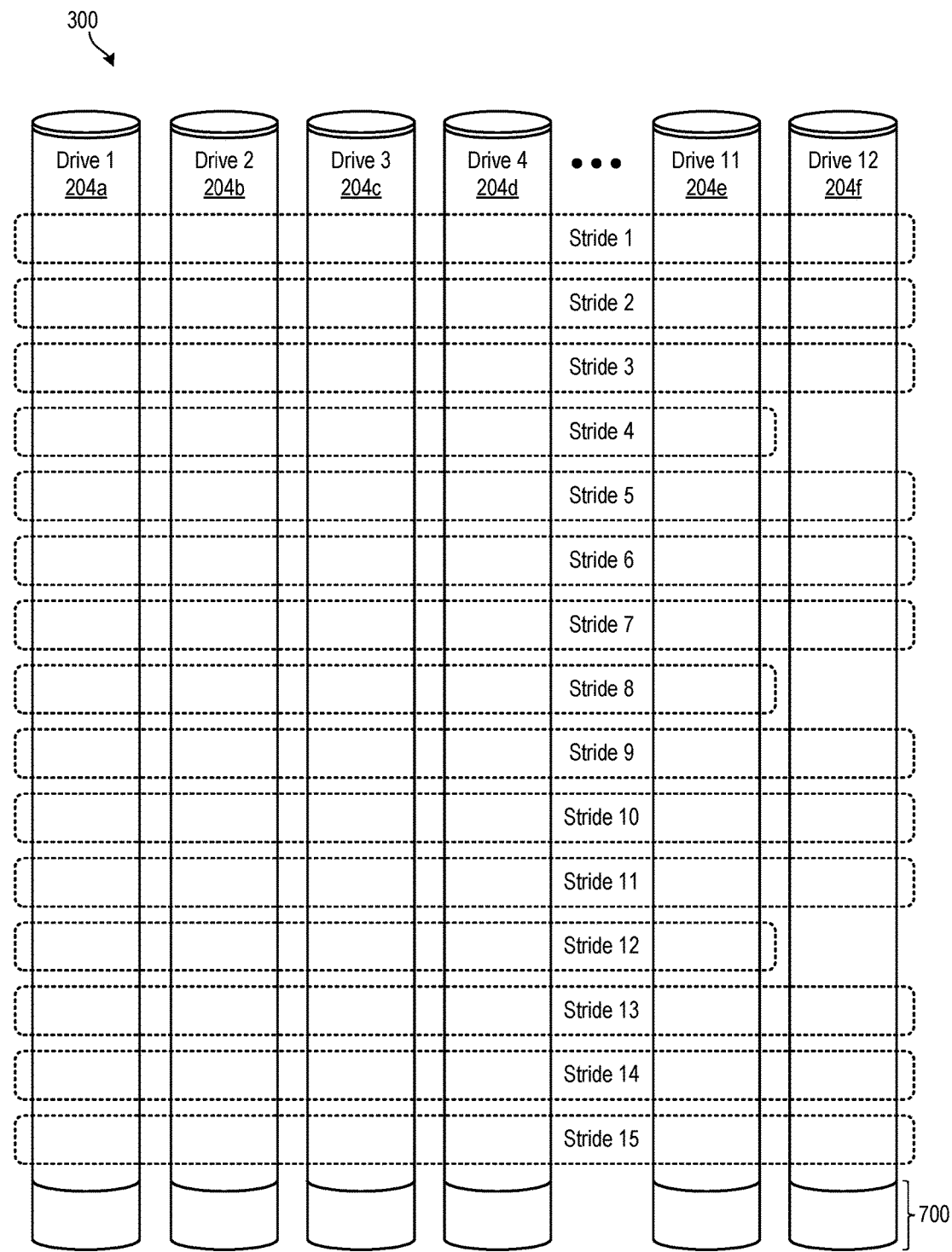
FIG. 7 is a high-level block diagram showing a third example of a RAID made up of heterogeneous storage drives, where the RAID is configured with a distributed spare.

Referring to FIG. 7, in certain embodiments, a RAID 300 may be configured to include one or more "distributed spares." To create a distributed spare 700, a small amount of storage space may be reserved on each storage drive 204 belonging to a RAID 300, as shown in FIG. 7. Collectively, the storage space may be substantially equivalent to the entire storage space of a single spare physical storage drive 204. In other words, the small amount of storage space when added together may substantially equal the entire storage space of one physical storage drive 204. Normally, when a storage drive 204 in a RAID 300 fails, data may be initially rebuilt on the distributed spare 700 instead of a physical spare storage drive 204. The distributed spare 700 allows data to be rebuilt much more quickly since data may be written to many storage drives 204 in parallel, as opposed to a single physical storage drive 204. Rebuild speed may also be increased because the distributed spare 700 resides on storage drives 204 that are already active and spinning, thereby making them immediately available to receive data. Once data from a failed storage drive is reconstructed on the distributed spare 700, the data may be copied to a physical spare storage drive 204 to free up the storage space on the distributed spare 700, thereby making it available for future drive failures.

Figure 8:
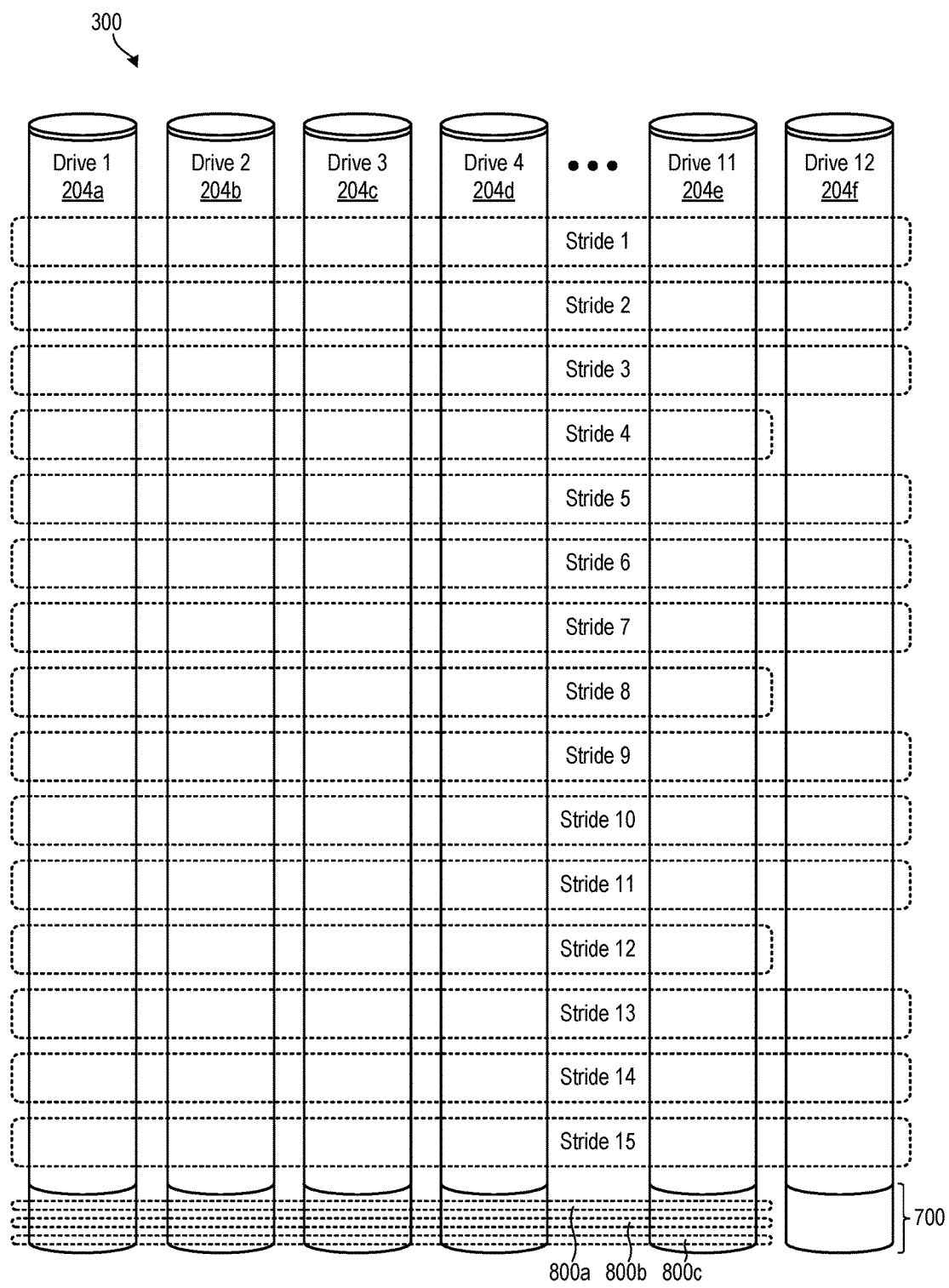
FIG. 8 is a high-level block diagram showing the RAID of FIG. 7, with some of the data from the underperforming storage drive stored in the distributed spare on the other storage drives of the RAID.

Referring to FIG. 8, in certain embodiments in accordance with the invention, a distributed spare 700 may be used to balance performance in a redundant array of independent disks (RAID) made up of heterogeneous storage drives 204. For example, assume that a RAID 300 contains a lower-performing storage drive 204f that only has seventy-five percent of the I/O performance of the other storage drives 204a-e in the RAID 300. Using the techniques described above in association with FIG. 3, the lower-performing storage drive 204f may only participate in seventy-five percent of the strides of the RAID 300. Instead of increasing the strip size for strides in which the lower-performing storage drive 204f does not participate, data that would normally be stored on the lower-performing storage drive 204f may be stored on the distributed spare 700 on the other storage drives 204a-e of the RAID 300. Thus, in this embodiment, each stride may have the same number of strips even if certain strips are stored in the distributed spare 700 as opposed to the lower-performing storage drive 204f. Thus, the strip omitted from the lower-performing storage drive 204f in association with Stride 4 may be striped across the remaining storage drives 204a-e in the distributed spare 700 (shown as stripe 800a); the strip omitted from the lower-performing storage drive 204f in association with Stride 8 may be striped across the remaining storage drives 204a-e in the distributed spare 700 (shown as stripe 800a); and the strip omitted from the lower-performing storage drive 204f in association with Stride 12 may be striped across the remaining storage drives 204a-e in the distributed spare 700 (shown as stripe 800c).

In certain embodiments, the technique described in association with FIG. 8 may utilize existing functionality that places data of a failed storage drive 204 on a distributed spare 700. In the example provided above (i.e., where the lower-performing storage drive 204f has only seventy-five percent of the I/O performance of other storage drives 204a-e in the RAID 300), the existing functionality may be invoked by "failing" the lower-performing storage drive 204f for twenty-five percent of the strides in the RAID 300.

The rebuild functionality would then automatically place the data of the lower-performing storage drive 204*f* for these twenty-five percent of strides in the storage area reserved for the distributed spare 700 on the other storage drives 204*a-e*. The lower-performing storage drive 204*f* would continue to store data for the other seventy-five percent of the strides. Because this would only use twenty-five percent of a distributed spare's storage space, the distributed spare 700 in this example could be used to store data from four storage drives 204 having performance characteristics similar to the lower-performing storage drive 204*f*.

Figure 9:
FIG. 9 is a high-level block diagram showing a bitmap for the RAID of FIG. 8.

One embodiment of a bitmap 400 for the configuration illustrated in FIG. 8 is shown in FIG. 9. As shown, the bitmap 400 includes a "1" for each storage drive 204 in the RAID 300 for each and every stride, including the lower-performing storage drive 204*f*. Thus, the bitmap 400 does not need to be modified to indicate that data is not stored on the lower-performing storage drive 204*f* for Strides 4, 8, and 12. Rather, the rebuild functionality described above may be modified to cause data that would normally be stored on the lower-performing storage drive 204*f* to be diverted to the distributed spare 700 for every fourth stride. Other strides would continue to have their data stored on the lower-performing storage drive 204*f*.

The flowcharts and/or block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for balancing performance in a redundant array of independent disks (RAID) made up of heterogeneous storage drives, the method comprising:
 implementing a RAID on a set of storage drives, the set of storage drives comprising a lower-performing storage drive that underperforms other storage drives in the set; and
 striping data across the set of storage drives such that the lower-performing storage drive participates in a smaller percentage of strides than the other storage drives in the set, wherein each stride comprises multiple strips stored on different storage drives of the set.

2. The method of claim 1, wherein the percentage is selected based on an amount the lower-performing storage drive underperforms other storage drives in the set.

3. The method of claim 1, further comprising, for strides in which the lower-performing storage drive does not participate, storing data associated with the lower-performing storage drive in a distributed spare implemented on other storage drives in the set.

4. The method of claim 1, further comprising, for each stride, providing a bitmap indicating which storage drives participate in the stride.

5. The method of claim 4, wherein the bitmap is shared by multiple strides.

6. The method of claim 1, wherein the lower-performing storage drive does not participate in every $N^{th}$ stride, where N is selected based on an amount the lower-performing storage drive underperforms other storage drives in the set.

7. The method of claim 1, wherein the lower-performing storage drive has at least one of: reduced I/O performance compared to other storage drives in the set; reduced RPM speed compared to other storage drives in the set; and less storage space than other storage drives in the set.

8. A computer program product for balancing performance in a redundant array of independent disks (RAID) made up of heterogeneous storage drives, the computer program product comprising a computer-readable medium having computer-usable program code embodied therein, the computer-usable program code configured to perform the following when executed by at least one processor:
 implement a RAID on a set of storage drives, the set of storage drives comprising a lower-performing storage drive that underperforms other storage drives in the set; and
 stripe data across the set of storage drives such that the lower-performing storage drive participates in a smaller percentage of strides than the other storage drives in the set, wherein each stride comprises multiple strips stored on different storage drives of the set.

9. The computer program product of claim 8, wherein the percentage is selected based on an amount the lower-performing storage drive underperforms other storage drives in the set.

10. The computer program product of claim 8, wherein the computer-usable program code is further configured to, for strides in which the lower-performing storage drive does not participate, store data associated with the lower-performing storage drive in a distributed spare implemented on other storage drives in the set.

11. The computer program product of claim 8, wherein the computer-usable program code is further configured to, for each stride, provide a bitmap indicating which storage drives participate in the stride.

12. The computer program product of claim 11, wherein the bitmap is shared by multiple strides.

13. The computer program product of claim 8, wherein the lower-performing storage drive does not participate in every Nth stride, where N is selected based on an amount the lower-performing storage drive underperforms other storage drives in the set.

14. The computer program product of claim 8, wherein the lower-performing storage drive has at least one of: reduced I/O performance compared to other storage drives in the set; reduced RPM speed compared to other storage drives in the set; and less storage space than other storage drives in the set.

15. A system for balancing performance in a redundant array of independent disks (RAID) made up of heterogeneous storage drives, the system comprising:
 at least one processor;
 at least one memory device coupled to the at least one processor and storing instructions for execution on the at least one processor, the instructions causing the at least one processor to:

implement a RAID on a set of storage drives, the set of storage drives comprising a lower-performing storage drive that underperforms other storage drives in the set; and stripe data across the set of storage drives such that the lower-performing storage drive participates in a smaller percentage of strides than the other storage drives in the set, wherein each stride comprises multiple strips stored on different storage drives of the set.

16. The system of claim 15, wherein the percentage is selected based on an amount the lower-performing storage drive underperforms other storage drives in the set.

17. The system of claim 15, wherein the instructions further cause the at least one processor to, for strides in which the lower-performing storage drive does not participate, store data associated with the lower-performing storage drive in a distributed spare implemented on other storage drives in the set.

18. The system of claim 15, wherein the instructions further cause the at least one processor to, for each stride, provide a bitmap indicating which storage drives participate in the stride.

19. The system of claim 15, wherein the lower-performing storage drive does not participate in every Nth stride, where N is selected based on an amount the lower-performing storage drive underperforms other storage drives in the set.

20. The system of claim 15, wherein the lower-performing storage drive has at least one of: reduced I/O performance compared to other storage drives in the set; reduced RPM speed compared to other storage drives in the set; and less storage space than other storage drives in the set.

* * * * *